US010355501B2

(12) United States Patent
Warren

(10) Patent No.: US 10,355,501 B2
(45) Date of Patent: Jul. 16, 2019

(54) ELECTRICAL CHARGING DEVICES WITH RESILIENT ACTUATION

(71) Applicant: William J. Warren, Frisco, TX (US)

(72) Inventor: William J. Warren, Frisco, TX (US)

( * ) Notice: Subject to any disclaimer, the term of this patent is extended or adjusted under 35 U.S.C. 154(b) by 8 days.

(21) Appl. No.: 15/865,102

(22) Filed: Jan. 8, 2018

(65) Prior Publication Data
US 2019/0109472 A1 Apr. 11, 2019

Related U.S. Application Data

(60) Provisional application No. 62/571,030, filed on Oct. 11, 2017, provisional application No. 62/574,854, filed on Oct. 20, 2017, provisional application No. 62/584,843, filed on Nov. 12, 2017.

(51) Int. Cl.
*H02J 7/00* (2006.01)
*H01R 33/94* (2006.01)

(52) U.S. Cl.
CPC ............ *H02J 7/0042* (2013.01); *H01R 33/94* (2013.01); *H02J 7/0044* (2013.01)

(58) Field of Classification Search
CPC ............................. H02J 7/0042; H02J 7/0044
USPC .......................................... 320/107, 111, 115
See application file for complete search history.

(56) References Cited

U.S. PATENT DOCUMENTS

| | | |
|---|---|---|
| 2,392,445 A | 1/1946 | Anderson |
| 4,536,694 A | 8/1985 | McCarty et al. |
| 5,187,744 A | 2/1993 | Richter |
| D343,107 S | 1/1994 | Fulton |
| 5,305,381 A | 4/1994 | Wang et al. |
| 5,587,645 A | 12/1996 | Sciammarella et al. |
| 5,648,712 A | 7/1997 | Hahn |
| 5,679,017 A | 10/1997 | Smith |
| 5,762,512 A | 6/1998 | Trant et al. |
| 5,903,645 A | 5/1999 | Tsay |
| 6,029,215 A | 2/2000 | Watts, Jr. et al. |

(Continued)

FOREIGN PATENT DOCUMENTS

| | | |
|---|---|---|
| EP | 2228263 A1 | 9/2010 |
| WO | WO2016003585 A1 | 1/2016 |

OTHER PUBLICATIONS

International Search Report and Written Opinion dated Sep. 4, 2015 for Patent Cooperation Treaty Application PCT/US2015/034073, filed Jun. 3, 2015, 8 pages.

*Primary Examiner* — Richard V Muralidar
(74) *Attorney, Agent, or Firm* — Carr & Ferrell LLP

(57) ABSTRACT

Electrical charging devices with resilient actuation are provided herein. An example apparatus includes a receiver body having a sidewall of the receiver body, wherein a lateral portion of the sidewall of the receiver body has a pass-through slot, and a lower support plate extending forwardly from the sidewall of the receiver body; an electronics assembly including a housing that receives charging circuitry, a bolt lever extending from a sidewall of the housing, the bolt lever extending through the pass-through slot of the receiver body, and an electrical conductor extending from a front of the housing, the electrical conductor in electrical communication with the charging circuitry; and a stabilizer that is hingedly coupled to the housing, the stabilizer pivoting between a stored configuration and a deployed configuration when the bolt lever moves from a rearward position to a forward position.

20 Claims, 5 Drawing Sheets

(56) References Cited

U.S. PATENT DOCUMENTS

| | | |
|---|---|---|
| 6,091,611 A | 7/2000 | Lanni |
| 6,224,408 B1 | 5/2001 | Wu |
| 6,341,218 B1 | 1/2002 | Poplawsky et al. |
| 6,510,067 B1 | 1/2003 | Toebes |
| 6,518,724 B2 | 2/2003 | Janik |
| 6,831,848 B2 | 12/2004 | Lanni |
| 6,848,802 B2 | 2/2005 | Chen |
| 6,861,822 B2 | 3/2005 | Wei |
| 6,938,867 B2 | 9/2005 | Dirks |
| 7,066,767 B2 | 6/2006 | Liao |
| 7,075,779 B2 | 7/2006 | Bothe et al. |
| 7,166,987 B2 | 1/2007 | Lee et al. |
| 7,254,424 B1 | 8/2007 | Reichert |
| D573,866 S | 7/2008 | Smith |
| 7,524,197 B2 | 4/2009 | Mills et al. |
| 7,528,323 B2 | 5/2009 | Wu et al. |
| 7,540,748 B2 | 6/2009 | Tracy et al. |
| 7,551,458 B2 | 6/2009 | Carnevali |
| 7,623,182 B2 | 11/2009 | Byrne et al. |
| 7,654,855 B2 * | 2/2010 | Liao ............ H01R 13/60 439/441 |
| 7,682,185 B2 | 3/2010 | Liao |
| 7,699,664 B2 | 4/2010 | Kim et al. |
| D617,863 S | 6/2010 | Moody et al. |
| 7,850,484 B2 | 12/2010 | Hayashi et al. |
| 7,857,659 B2 | 12/2010 | Wang et al. |
| 7,887,341 B2 | 2/2011 | Liao |
| 8,113,873 B1 | 2/2012 | Sarraf |
| D676,380 S | 2/2013 | Sun |
| 8,367,235 B2 | 2/2013 | Huang |
| 8,378,625 B2 * | 2/2013 | Gourley ............ H02J 5/00 320/107 |
| D680,941 S | 4/2013 | Deppen |
| 8,414,318 B1 | 4/2013 | Chen |
| 8,415,920 B2 | 4/2013 | Liao |
| D687,375 S | 8/2013 | Franco |
| 8,616,327 B1 | 12/2013 | Palacios |
| 8,686,683 B2 | 4/2014 | Caskey et al. |
| 8,712,482 B2 | 4/2014 | Sodas et al. |
| 8,794,997 B2 | 8/2014 | Tin |
| 8,805,640 B2 | 8/2014 | Nielsen et al. |
| 8,864,517 B2 | 10/2014 | Cohen |
| D719,008 S | 12/2014 | Han |
| D723,457 S | 3/2015 | Sorias |
| 9,027,486 B1 | 5/2015 | Berkovitz |
| 9,130,332 B2 | 9/2015 | Yosef |
| 9,161,464 B2 | 10/2015 | Liao |
| D745,628 S | 12/2015 | Barfoot et al. |
| 9,310,841 B2 | 4/2016 | Williams |
| 9,356,454 B2 | 5/2016 | Caren et al. |
| D760,647 S | 7/2016 | Chen |
| D762,169 S | 7/2016 | Lei |
| 9,429,994 B1 | 8/2016 | Vier |
| 9,473,607 B2 | 10/2016 | An |
| D774,377 S | 12/2016 | Hilliaho |
| D778,706 S | 2/2017 | Atkins |
| 9,568,148 B2 | 2/2017 | Carnevali |
| D783,526 S | 4/2017 | Warren |
| 9,620,911 B2 | 4/2017 | Warren |
| 9,627,802 B2 | 4/2017 | Warren |
| D791,070 S | 7/2017 | Son |
| D791,076 S | 7/2017 | Kim |
| D791,697 S | 7/2017 | Precheur |
| D792,752 S | 7/2017 | Chung et al. |
| D795,190 S | 8/2017 | Tzeng |
| 9,742,107 B2 | 8/2017 | Choi et al. |
| 9,812,811 B1 | 11/2017 | Gorin et al. |
| 9,904,327 B2 | 2/2018 | Whitt, III et al. |
| D813,339 S | 3/2018 | Maroney |
| D813,658 S | 3/2018 | Wright |
| D814,264 S | 4/2018 | Werdowatz |
| 9,997,882 B1 | 6/2018 | Warren |
| 10,027,149 B2 * | 7/2018 | Warren ............ H01R 31/065 |
| 2002/0149695 A1 | 10/2002 | Kayanuma |
| 2003/0218445 A1 | 11/2003 | Behar |
| 2004/0105024 A1 | 6/2004 | Takahashi |
| 2004/0251873 A1 | 12/2004 | Simoes et al. |
| 2005/0178633 A1 | 8/2005 | Liao |
| 2006/0105819 A1 | 5/2006 | Liao |
| 2006/0194467 A1 | 8/2006 | Beasley et al. |
| 2007/0034753 A1 | 2/2007 | Lee |
| 2007/0258204 A1 | 11/2007 | Chang et al. |
| 2008/0157715 A1 * | 7/2008 | Rosenboom ......... H02J 7/0044 320/108 |
| 2008/0227380 A1 | 9/2008 | Hsu et al. |
| 2009/0047827 A1 | 2/2009 | Liao |
| 2011/0031287 A1 | 2/2011 | Le Gette et al. |
| 2012/0049800 A1 | 3/2012 | Johnson et al. |
| 2012/0077361 A1 | 3/2012 | Youssefi-Shams et al. |
| 2012/0178506 A1 | 7/2012 | Sorias et al. |
| 2012/0214348 A1 | 8/2012 | Youssefi-Shams et al. |
| 2013/0057215 A1 | 3/2013 | Rajeswaran et al. |
| 2013/0093220 A1 | 4/2013 | Pajic |
| 2013/0150134 A1 | 6/2013 | Pliner et al. |
| 2013/0178252 A1 * | 7/2013 | Sorias ............ H02J 7/0042 455/573 |
| 2013/0242495 A1 | 9/2013 | Bathiche et al. |
| 2014/0030912 A1 | 1/2014 | Cohen |
| 2014/0085814 A1 | 3/2014 | Kielland |
| 2014/0139989 A1 | 5/2014 | Mori et al. |
| 2015/0011265 A1 | 1/2015 | Walsh, Jr. |
| 2015/0015204 A1 | 1/2015 | Sorias et al. |
| 2015/0207286 A1 | 7/2015 | Chen et al. |
| 2015/0207350 A1 | 7/2015 | Chen et al. |
| 2015/0234108 A1 | 8/2015 | Harley, Jr. |
| 2015/0234478 A1 | 8/2015 | Belesiu et al. |
| 2015/0263447 A1 | 9/2015 | Liao |
| 2015/0268699 A1 | 9/2015 | Bathiche et al. |
| 2015/0380872 A1 | 12/2015 | Warren |
| 2016/0087381 A1 | 3/2016 | Wong et al. |
| 2016/0090767 A1 | 3/2016 | Park et al. |
| 2016/0118758 A1 | 4/2016 | Cymerman |
| 2016/0141815 A1 | 5/2016 | Warren |
| 2016/0204816 A1 | 7/2016 | Abramovich |
| 2016/0209885 A1 | 7/2016 | Ellis |
| 2016/0218536 A1 | 7/2016 | Caren et al. |
| 2016/0261129 A1 | 9/2016 | Warren |
| 2016/0380457 A1 | 12/2016 | Criss |
| 2017/0005496 A1 | 1/2017 | Warren |
| 2017/0012450 A1 | 1/2017 | Warren |
| 2017/0101256 A1 | 4/2017 | Zeitlin |
| 2017/0163080 A1 | 6/2017 | Warren |
| 2018/0342840 A1 * | 11/2018 | Messinger ......... H01R 13/6675 |

* cited by examiner

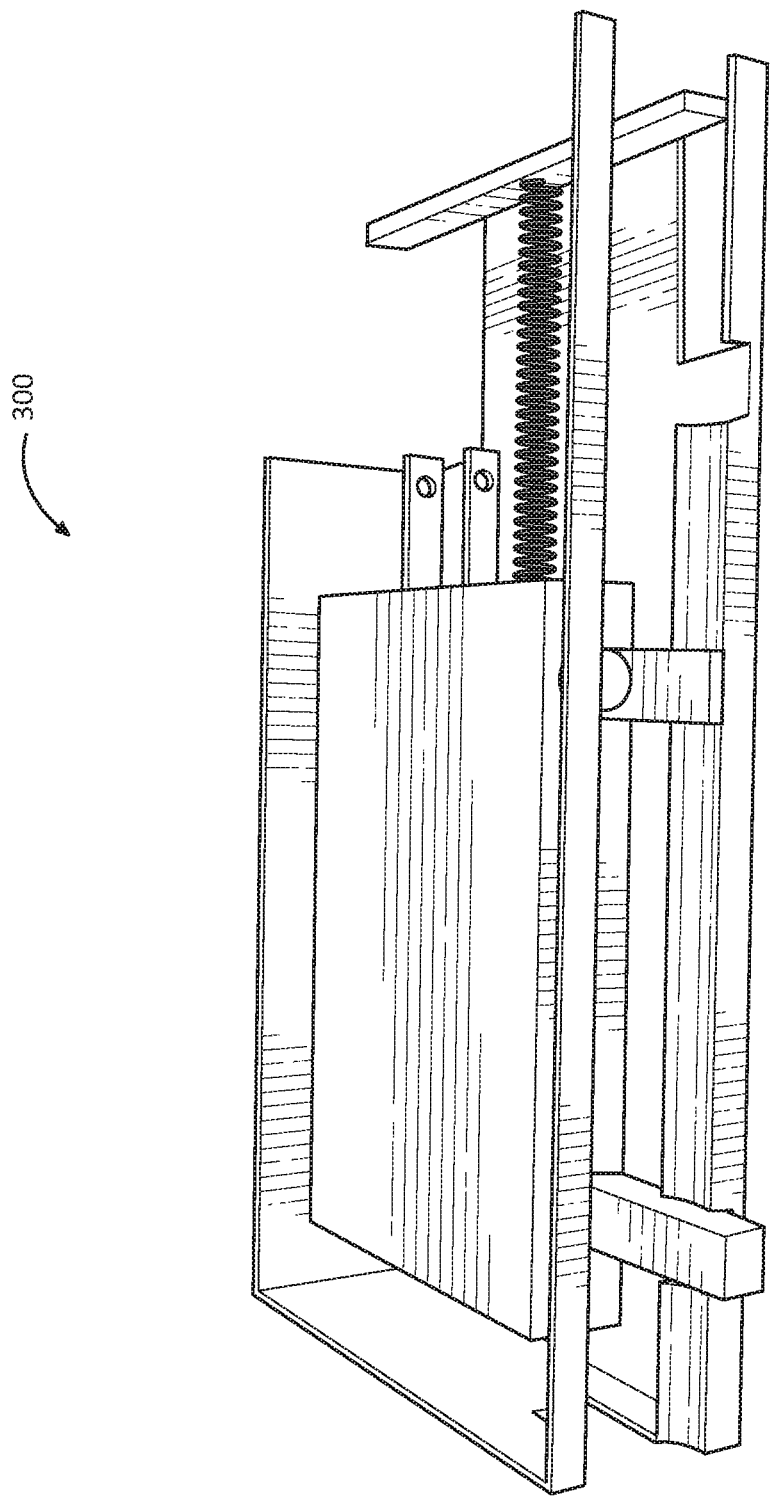

ELECTRICAL CHARGING DEVICES WITH RESILIENT ACTUATION

CROSS-REFERENCE TO RELATED APPLICATIONS

The present application claims the benefit of U.S. Provisional Application No. 62/571,030, filed on Oct. 11, 2017, of U.S. Provisional Application No. 62/574,854, filed on Oct. 20, 2017, and of U.S. Provisional Application No. 62/584,843, filed on Nov. 12, 2017. All of these applications are hereby incorporated by reference herein in their entireties, including all references cited therein.

FIELD

The present technology pertains to devices for electronic charging, and more specifically, but not by way of limitation, to electronic charging stations that couple with a wall outlet, as well as receive and retain an electronic device such as a Smartphone, tablet, laptop, and so forth, during charging. These devices comprise stabilizers having various shapes and configurations.

SUMMARY

Various embodiments of the present disclosure are directed to an apparatus, including: (i) a receiver body comprising: (a) a sidewall of the receiver body, wherein a lateral portion of the sidewall of the receiver body comprises a pass-through slot; and (b) a lower support plate extending forwardly from the sidewall of the receiver body; (ii) an electronics assembly comprising: (a) a housing that receives charging circuitry; (b) a bolt lever extending from a sidewall of the housing, the bolt lever extending through the pass-through slot of the receiver body; and (c) an electrical conductor extending from a front of the housing, the electrical conductor in electrical communication with the charging circuitry; and (iii) a stabilizer that is hingedly coupled to the housing, the stabilizer pivoting between a stored configuration and a deployed configuration when the bolt lever moves from a rearward position to a forward position.

Various embodiments of the present disclosure are directed to an apparatus, including (i) a receiver body comprising: (a) a sidewall of the receiver body, wherein a lateral portion of the sidewall of the receiver body comprises a pass-through slot; (b) a lower support plate extending forwardly from the sidewall of the receiver body, the lower support plate comprising a support plate sidewall having a notch; and (c) a fence extending perpendicularly from an end of the lower support plate; (ii) an electronics assembly comprising: (a) a housing that receives charging circuitry; (b) a bolt lever extending from a sidewall of the housing, the bolt lever extending through the pass-through slot of the receiver body, and the bolt lever dropping into the notch of the support plate sidewall when the bolt lever is moved to a forward position; and (c) an electrical conductor extending from a front of the housing, the electrical conductor in electrical communication with the charging circuitry; (iii) a stabilizer that is hingedly coupled to the housing, the stabilizer pivoting between a stored configuration and a deployed configuration when the bolt lever moves from a rearward position to a forward position; and (iv) means for resiliently transitioning the electronics assembly into a stored position when the bolt lever is removed from the notch of the support plate sidewall.

Various embodiments of the present disclosure are directed to an apparatus, including: (i) a receiver body comprising: (a) a sidewall of the receiver body, wherein a lateral portion of the sidewall comprises a pass-through slot; (b) a lower support plate extending forwardly from the sidewall of the receiver body, the lower support plate comprising a support plate sidewall having a notch; and (c) a fence extending perpendicularly from an end of the lower support plate; (ii) an electronics assembly comprising: (a) a housing that receives charging circuitry; (b) a bolt lever extending from a sidewall of the housing, the bolt lever extending through the pass-through slot of the receiver body, and the bolt lever dropping into the notch of the support plate sidewall when the bolt lever is moved to a forward position; and (c) an electrical conductor extending from a front of the housing, the electrical conductor in electrical communication with the charging circuitry; and (iii) means for resiliently transitioning the electronics assembly into a stored position when the bolt lever is removed from the notch of the support plate sidewall.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 7 is a perspective view of yet another example apparatus of the present technology.

DETAILED DESCRIPTION

The present disclosure is now described more fully with reference to the accompanying drawings, in which example embodiments of the present disclosure are shown. The present disclosure may, however, be embodied in many different forms and should not be construed as necessarily being limited to the example embodiments set forth herein. Rather, these example embodiments are provided so that the disclosure is thorough and complete, and fully conveys the concepts of the present disclosure to those skilled in the art. Also, features described with respect to certain example embodiments may be combined in and/or with various other example embodiments. Different aspects and/or elements of example embodiments, as disclosed herein, may be combined in a similar manner. Further, at least some example embodiments may individually and/or collectively be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity, at least as described herein, in any manner, irrespective of the at least one entity have any relationship to the subject matter of the present disclosure.

Generally described, the present technology involves devices that are used to charge electronic devices. Example types of electronic devices that can be charged using the present technology include, but are not limited to, cellular telephones, Smartphones, PDAs, tablets, phablets, laptops, or any other mobile electronic device that requires recharging through an electrical interface or charging port.

Figure 1:
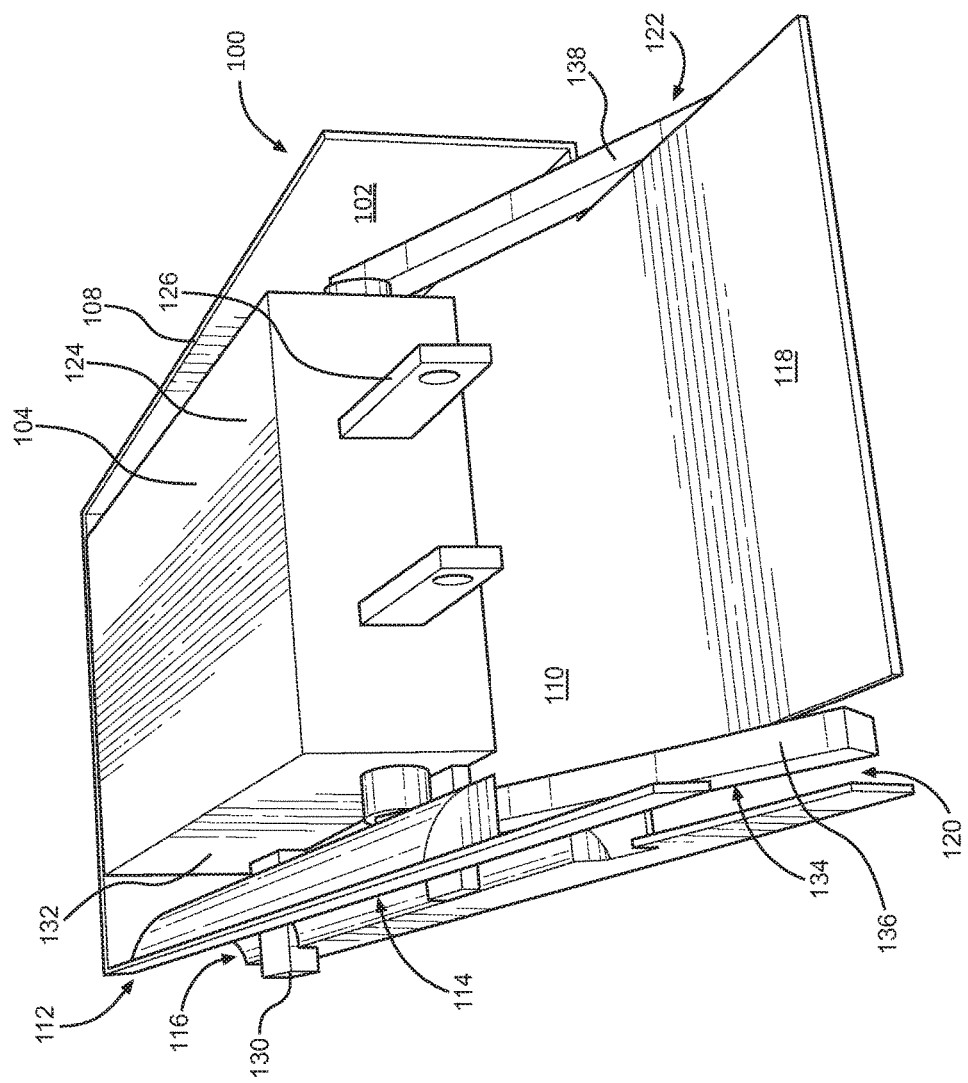
FIG. 1 is a perspective view of an example apparatus of the present technology.
Figure 2:
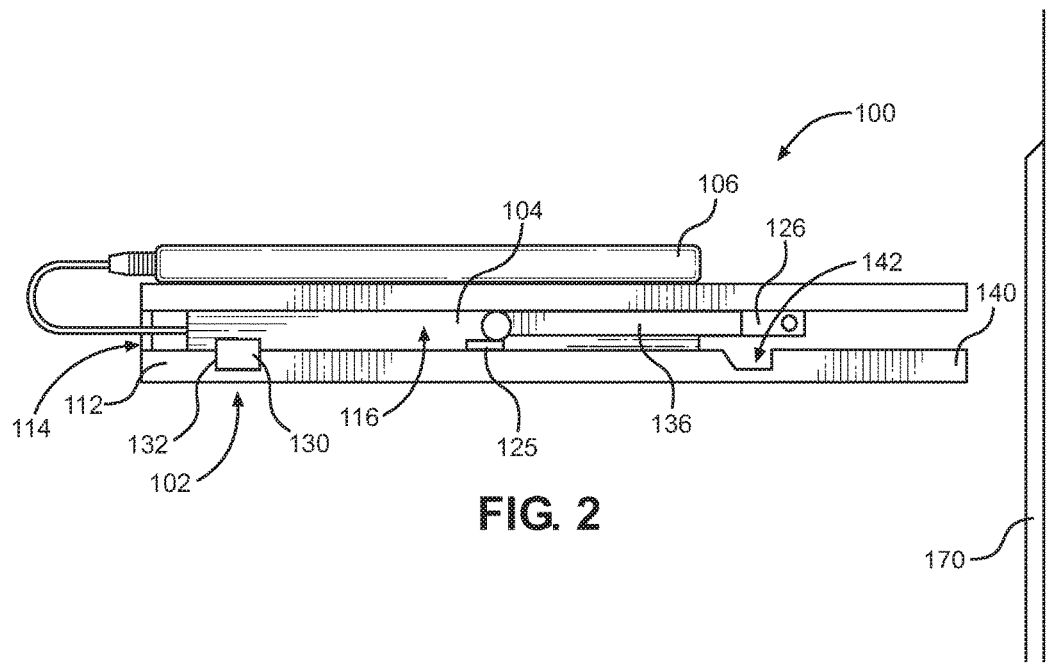
FIG. 2 is a side view of the apparatus of FIG. 1 in a stored configuration.
Figure 3:
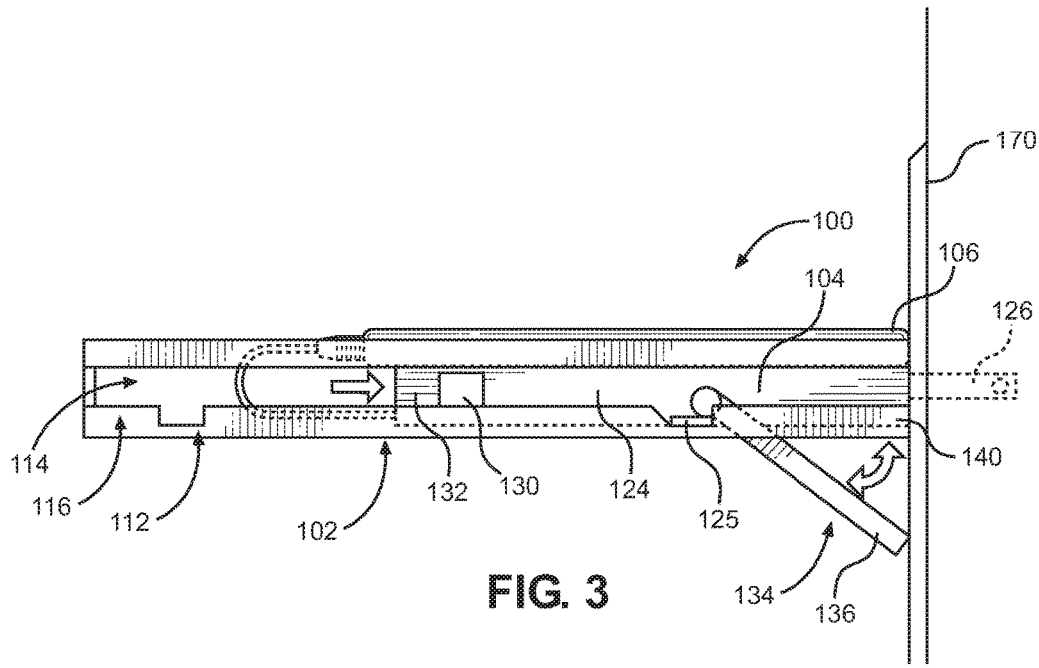
FIG. 3 is a side view of the apparatus of FIG. 1 in a deployed configuration.

Turning now to FIGS. 1-3, an example charging apparatus 100 is illustrated. The apparatus 100 generally comprises a receiver body 102 and an electronics assembly 104. An electronic device 106 disposable on an upper surface of the electronics assembly 104 and electrically coupled to the electronics assembly 104 for charging.

In general, the receiver body 102 comprises a sidewall 108 that surrounds three sides of a lower surface 110. A lateral portion 112 of the sidewall 108 comprises a pass-through slot or track 114 that divides an arcuate groove 116 that extends along the length of the lateral portion 112.

Although not shown, an upper surface can be used to enclose the upper portion of the receiver body 102. The rear portion of the sidewall 108 can comprise an aperture that allows a charging cord to extend therethrough. The charging cord is coupled with the electronics assembly 104 and can plug into a charging interface of the electronic device 106. The charging cable is an example means for electrically coupling the charging circuitry with the electronic device 106. This means can comprise a cable, wire, inductor, and so forth.

In one or more embodiments, the receiver body 102 further comprises a lower support plate 118 that extends from the lower surface 110 of the receiver body 102. In various embodiments, the lower support plate 118 has a narrower width than the width of the lower surface 110 of the receiver body 102 due to the presence of spaces 120 and 122 that allow for armatures of a stabilizer to pivot.

In various embodiments, the electronics assembly 104 comprises a housing 124 that encloses a charging circuitry.

In one embodiment, the charging circuitry can comprise a printed circuit board with various permutations of electrical components. In general, the charging circuitry is configured to transform the AC power waveform received from an outlet into DC power that is appropriate for charging the electronic device 106.

In some embodiments, the charging circuitry can include combinations of electrolytic capacitors, MOSFET switching transistors, flyback transformers, a controller integrated circuit, capacitors, diodes, R-C snubber circuits, EMI (electromagnetic interference) circuits, inductors, control chips, Schottky diodes, Tantalum filter capacitors, as well as any combinations thereof, in order to provide the desired transformation of AC to DC functions.

In some embodiments, the charging circuitry is an advanced flyback switching power supply that receives the AC voltage in ranges of 100 to 240 volts, and produces approximately five watts of smooth voltage power. AC line power is converted to high voltage DC current using a diode bridge. The DC power is switched off and on by a transistor controlled by a power supply controller IC.

In some embodiments, the chopped DC power supply is fed back in to a flyback transformer, which converts the DC power to a low voltage AC waveform. The AC waveform is then converted into DC, which is filtered with a filter to obtain smooth power that is substantially free of interference. The electronics assembly 104 can comprise a feedback circuit that measures the voltage output to the electrical connector (e.g., electrical prongs or USB, for example) and sends a signal to the controller IC, which adjusts the switching frequency to obtain a desired voltage.

In various embodiments, the electronics assembly 104 comprises an electrical conductor 126. This can comprise any suitable electrical charging interface, such as a USB interface, electrical prongs configured for insertion in an outlet, or other similar electrical charging interface that would be known in the art, such as power over Ethernet, FireWire, MIDI, Thunderbolt, and so forth.

In some embodiments, the apparatus 100 can comprise a means for electrically coupling the electronics assembly 104 with the electronic device 106. This electrical conductor 126, such as outlet prongs, extends from a front of the housing 124. The electrical conductor 126 is also in electrical communication with the charging circuitry.

In some embodiments, the upper portion of the electronics assembly 104 comprises openings, such as notches or slits that allow the electrical conductor 128 to protrude through housing 124.

In various embodiments, a bolt lever 130 will extend from a sidewall 132 of the housing 124. The bolt lever 130 extends through the pass-through slot 114 of the receiver body 102, in some embodiments.

The electronics assembly 104 can be transitioned from a rearward position (see FIG. 2) to a forward position (see FIG. 3) when a user grips the bolt lever 130 and slides it rearward and/or forward. When the electronics assembly 104 is moved forward, the electronics assembly 104 will rest on the lower support plate 118 of the receiver body 102. When the electronics assembly 104 is moved rearward using the bolt lever 130, the electronics assembly 104 will be positioned within the confines of the sidewall 108 of the receiver body 102.

In various embodiments, the apparatus 100 can also comprise a stabilizer 134. The stabilizer 134 comprises two armatures 136 and 138 that are each pivotally connected to the housing 124 of the electronics assembly 104. That is, the two armatures 136 and 138 are pivotally coupled with opposing sides of the housing 124.

In some embodiments, the stabilizer 134 can pivot between a stored configuration and a deployed configuration when the bolt lever 130 of the electronics assembly 104 moves from a rearward position to a forward position. In general, the stabilizer armatures 136 and 138 will support the apparatus 100 and electronic device 106 when the electrical conductor is plugged into an outlet, such as a wall outlet. The stabilizer armatures can engage the wall or a lower portion of an outlet cover 170.

In various embodiments, the housing 124 of the electronics assembly 104 can also comprise stop plates, such as stop plate 125 that extend from the sidewall 132 of the housing 124 behind and below the pivoting connections between the two armatures 136 and 138 and the housing 124. The two armatures 136 and 138 contact their respective stop plates to limit travel of the two armatures 136 and 138 in the downward pivoting direction.

In some embodiments, the lower support plate 118 of the receiver body 102 comprises a support plate sidewall 140 having a notch 142. In use, the bolt lever 130 drops into the notch 142 of the support plate sidewall 140 when the bolt lever 130 is moved to the forward position as illustrated best in FIG. 3.

Figure 4:
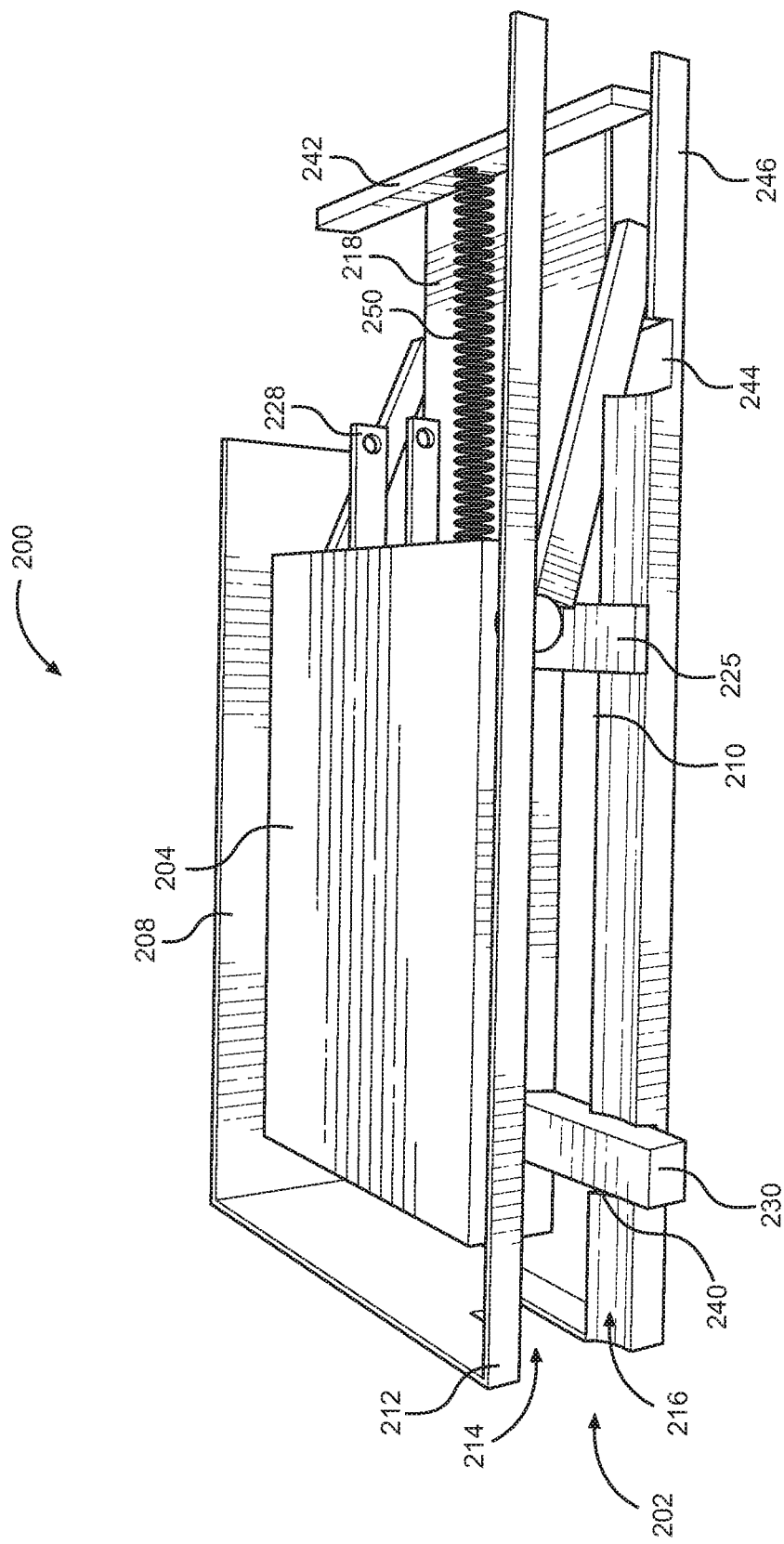
FIG. 4 is a perspective view of another example apparatus of the present technology.
Figure 5:
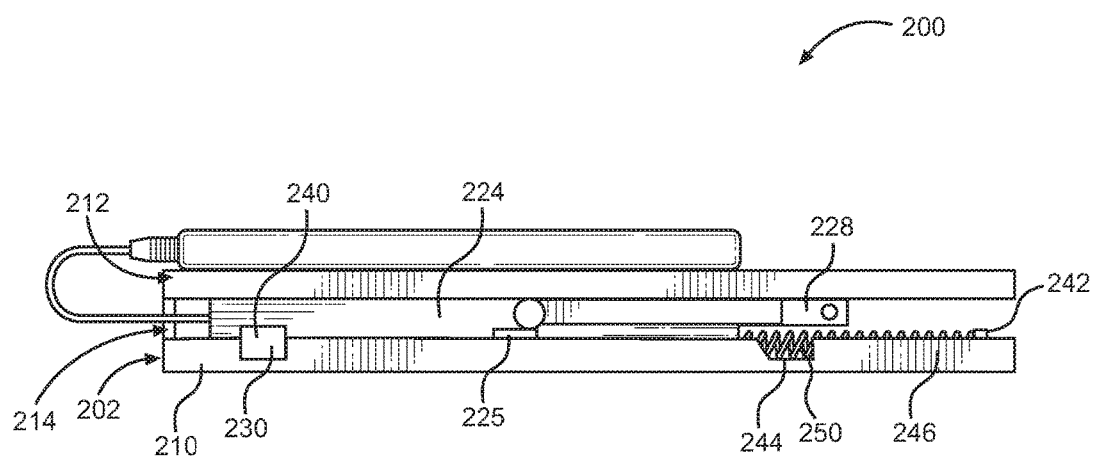
FIG. 5 is a side view of the apparatus of FIG. 4 in a stored configuration.
Figure 6:
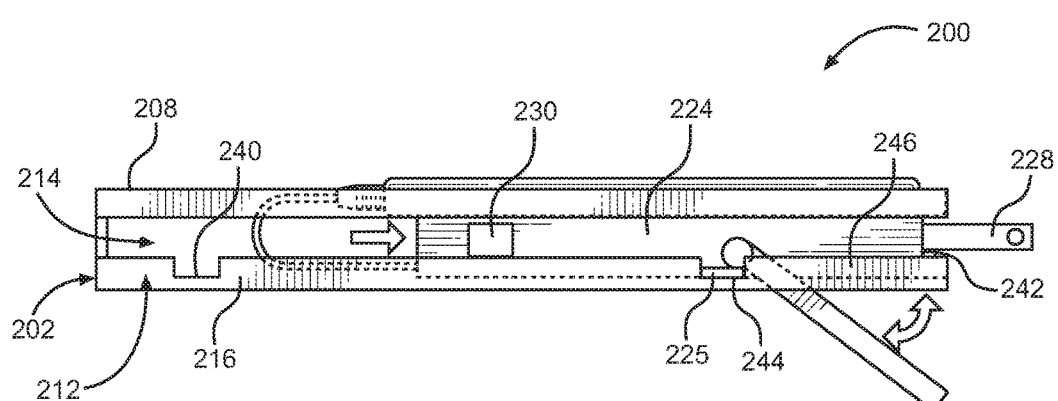
FIG. 6 is a side view of the apparatus of FIG. 4 in a deployed configuration.

FIGS. 4-6 collectively illustrate another example apparatus 200 that is identical in construction to the apparatus 100 of FIGS. 1-3 disclosed supra, but with additional components. These additional components are disclosed in greater detail below. For example, in some embodiments, the apparatus 200 comprises a receiver body 202 having a sidewall 208 that surrounds three sides of a lower surface 210. A lateral portion 212 of the sidewall comprises a pass-through slot or track 214 that divides an arcuate groove 216 that extends along the length of the lateral portion 212. The lower portion of the lateral portion 212 of the sidewall 208 comprises a rearward notch 240 that secures a bolt lever 230 in place when the bolt lever 230 is in the rearward position. The bolt lever 230 can be lifted out of and past the rearward notch 240 in order to allow the bolt lever 230 to translate to the forward position.

Additionally, the apparatus 200 comprises a fence 242 extending perpendicularly from an end of a lower support plate 218 of the receiver body 202. The fence 242 has a height that terminates so as to not prevent an electrical conductor 228 of the electronics assembly 204 from extending to a position that enables the electrical conductor 228 to interface with a wall outlet.

Extending between the fence 242 and a front of a housing 224 of the electronics assembly 204 is a means for resiliently transitioning the electronics assembly 204 into a stored position when the bolt lever 230 is removed from a notch 244 of a support plate sidewall 246 that extends from a lateral or side edge of the lower support plate 218 (e.g., perpendicular to the fence 242).

In some embodiments, the means for resiliently transitioning comprises a spring 250. When the bolt lever 230 is used to translate the electronics assembly 204 to a forward/deployed configuration, the spring 250 compresses against the fence 242.

When the bolt lever 230 is locked into the notch 244 of the support plate sidewall 246, such as when the electronics assembly 204 is in a deployed configuration where the electrical conductor 228 can interface with a wall outlet, the bolt lever 230 can be disengaged from the notch 244. When this occurs, the spring releases, resiliently moving the electronics assembly 204 to a rearward/stored configuration. The spring 250 retains the electronics assembly 204 in the rearward/stored configuration.

It will be understood that, in some embodiments, the stabilizer can be removed. FIG. 7 illustrates example apparatus 300, which is identical to the apparatus 200 disclosed above, but is lacking the stabilizer.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing and/or other any other types of manufacturing. For example, some manufacturing processes include three dimensional (3D) printing, laser cutting, computer numerical control (CNC) routing, milling, pressing, stamping, vacuum forming, hydroforming, injection molding, lithography and/or others.

Any and/or all elements, as disclosed herein, can include, whether partially and/or fully, a solid, including a metal, a mineral, a ceramic, an amorphous solid, such as glass, a glass ceramic, an organic solid, such as wood and/or a polymer, such as rubber, a composite material, a semiconductor, a nano-material, a biomaterial and/or any combinations thereof. Any and/or all elements, as disclosed herein, can include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, luminescence, anti-reflection and/or holographic, a photo-sensitive coating, an electronic and/or thermal property coating, such as for passivity, insulation, resistance or conduction, a magnetic coating, a water-resistant and/or waterproof coating, a scent coating and/or any combinations thereof.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. An apparatus, comprising:
   a receiver body comprising:
      a sidewall of the receiver body, wherein a lateral portion of the sidewall of the receiver body comprises a pass-through slot; and
      a lower support plate extending forwardly from the sidewall of the receiver body;

an electronics assembly comprising:
  a housing that receives charging circuitry;
  a bolt lever extending from a sidewall of the housing, the bolt lever extending through the pass-through slot of the receiver body; and
  an electrical conductor extending from a front of the housing, the electrical conductor in electrical communication with the charging circuitry; and
a stabilizer that is hingedly coupled to the housing, the stabilizer pivoting between a stored configuration and a deployed configuration when the bolt lever moves from a rearward position to a forward position.

2. The apparatus according to claim 1, wherein the lateral portion of the sidewall of the receiver body comprises an arcuate groove.

3. The apparatus according to claim 1, wherein the lower support plate comprises a support plate sidewall having a notch, further wherein the bolt lever drops into the notch of the support plate sidewall when the bolt lever is moved to the forward position.

4. The apparatus according to claim 1, wherein the stabilizer comprises two armatures that are pivotally coupled to opposing sides of the housing.

5. The apparatus according to claim 4, further comprising stop plates extending from the sidewall of the housing behind and below pivoting connections between the two armatures and the housing, the two armatures contacting the stop plates to limit travel of the two armatures.

6. The apparatus according to claim 4, wherein the electrical conductor comprises any of electrical prongs, universal serial bus (USB), FireWire, and microSD.

7. The apparatus according to claim 1, further comprising a rearward notch in the lateral portion of the sidewall of the receiver body that secures the bolt lever in place when the bolt lever is in the rearward position, the bolt lever being lifted out of and past the rearward notch in order to translate to the forward position.

8. An apparatus, comprising:
a receiver body comprising:
  a sidewall of the receiver body, wherein a lateral portion of the sidewall of the receiver body comprises a pass-through slot;
  a lower support plate extending forwardly from the sidewall of the receiver body, the lower support plate comprising a support plate sidewall having a notch; and
  a fence extending perpendicularly from an end of the lower support plate;
an electronics assembly comprising:
  a housing that receives charging circuitry;
  a bolt lever extending from a sidewall of the housing, the bolt lever extending through the pass-through slot of the receiver body, and the bolt lever dropping into the notch of the support plate sidewall when the bolt lever is moved to a forward position; and
  an electrical conductor extending from a front of the housing, the electrical conductor in electrical communication with the charging circuitry;
a stabilizer that is hingedly coupled to the housing, the stabilizer pivoting between a stored configuration and a deployed configuration when the bolt lever moves from a rearward position to the forward position; and
means for resiliently transitioning the electronics assembly into the stored configuration when the bolt lever is removed from the notch of the support plate sidewall.

9. The apparatus according to claim 8, wherein the means for resiliently transitioning the electronics assembly comprises a spring that couples with the front of the housing of the electronics assembly and the fence.

10. The apparatus according to claim 9, wherein the stabilizer comprises two armatures that are pivotally coupled to opposing sides of the housing.

11. The apparatus according to claim 10, further comprising stop plates extending from the sidewall of the housing behind and below pivoting connections between the two armatures and the housing, the two armatures contacting the stop plates to limit travel of the two armatures.

12. The apparatus according to claim 8, wherein the electrical conductor comprises any of electrical prongs, universal serial bus (USB), FireWire, and microSD.

13. The apparatus according to claim 8, further comprising a rearward notch in the lateral portion of the sidewall of the receiver body that secures the bolt lever in place when the bolt lever is in the rearward position, the bolt lever being lifted out of and past the rearward notch in order to translate to the forward position.

14. An apparatus, comprising:
a receiver body comprising:
  a sidewall of the receiver body, wherein a lateral portion of the sidewall comprises a pass-through slot;
  a lower support plate extending forwardly from the sidewall of the receiver body, the lower support plate comprising a support plate sidewall having a notch; and
  a fence extending perpendicularly from an end of the lower support plate;
an electronics assembly comprising:
  a housing that receives charging circuitry;
  a bolt lever extending from a sidewall of the housing, the bolt lever extending through the pass-through slot of the receiver body, and the bolt lever dropping into the notch of the support plate sidewall when the bolt lever is moved to a forward position; and
  an electrical conductor extending from a front of the housing, the electrical conductor in electrical communication with the charging circuitry; and
means for resiliently transitioning the electronics assembly into a stored position when the bolt lever is removed from the notch of the support plate sidewall.

15. The apparatus according to claim 14, wherein the lateral portion of the sidewall comprises an arcuate groove.

16. The apparatus according to claim 14, wherein the electrical conductor comprises any of electrical prongs, universal serial bus (USB), FireWire, and microSD.

17. The apparatus according to claim 14, further comprising a stabilizer that is hingedly coupled to the housing, the stabilizer pivoting between the stored configuration and a deployed configuration when the bolt lever moves from a rearward position to the forward position.

18. The apparatus according to claim 17, wherein the stabilizer comprises two armatures that are pivotally coupled to opposing sides of the housing.

19. The apparatus according to claim 18, further comprising stop plates extending from the sidewall of the housing behind and below pivoting connections between the two armatures and the housing, the two armatures contacting the stop plates to limit travel of the two armatures.

20. The apparatus according to claim 14, further comprising a rearward notch in the lateral portion of the sidewall of the receiver body that secures the bolt lever in place when the bolt lever is in the rearward position, the bolt lever being lifted out of and past the rearward notch in order to translate to the forward position.

* * * * *